(12) United States Patent
Xu et al.

(10) Patent No.: US 10,886,853 B1
(45) Date of Patent: Jan. 5, 2021

(54) POWER DEVICE DRIVING METHOD AND DRIVE CIRCUIT FOR SWITCHING CIRCUIT, AND THE SWITCHING CIRCUIT

(71) Applicant: Joulwatt Technology (Hangzhou)Co., LTD., Hangzhou (CN)

(72) Inventors: Aimin Xu, Hangzhou (CN); Xunjin Dou, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/699,669

(22) Filed: Dec. 1, 2019

(30) Foreign Application Priority Data

Aug. 21, 2019 (CN) .......................... 2019 1 0772672

(51) Int. Cl.
*H02M 3/158* (2006.01)
*H02M 1/08* (2006.01)
*H02M 1/00* (2006.01)

(52) U.S. Cl.
CPC ........... *H02M 3/1588* (2013.01); *H02M 1/08* (2013.01); *H02M 2001/0054* (2013.01)

(58) Field of Classification Search
CPC .............. H02M 3/156–158; H02M 3/335–337
See application file for complete search history.

(56) References Cited

U.S. PATENT DOCUMENTS

| 6,841,977 B2 * | 1/2005 | Huang ................ | H02M 3/1588 323/224 |
| 7,977,926 B2 * | 7/2011 | Williams ............ | H02M 3/1582 323/223 |
| 2006/0226819 A1 * | 10/2006 | Xu ........................ | H02M 3/338 323/268 |

* cited by examiner

*Primary Examiner* — Thienvu V Tran
*Assistant Examiner* — Nusrat Quddus
(74) *Attorney, Agent, or Firm* — Bayramoglu Law Offices LLC

(57) ABSTRACT

A power device driving method and a driving circuit for a switching circuit having a main switching transistor, a synchronous rectifier, and an inductive element. When a switching signal indicates that the synchronous rectifier is turned from on to off and the main switching transistor is turned from off to on, a gate voltage of the synchronous rectifier is pulled down to be lower than a threshold voltage of the synchronous rectifier and higher than zero voltage by a body effect of a MOS transistor, and timing is started. When detecting that a gate voltage of the main switching transistor rises to a first voltage or the timing reaches a first time, the gate voltage of the synchronous rectifier is pulled down to the zero voltage.

10 Claims, 4 Drawing Sheets

US 10,886,853 B1

POWER DEVICE DRIVING METHOD AND DRIVE CIRCUIT FOR SWITCHING CIRCUIT, AND THE SWITCHING CIRCUIT

CROSS REFERENCE TO THE RELATED APPLICATIONS

This application is based upon and claims priority to Chinese Patent Application No. 201910772672.7, filed on Aug. 21, 2019, the entire contents of which are incorporated herein by reference.

TECHNICAL FIELD

The present disclosure relates to the field of power electronics, and in particular to a power device driving method and a driving circuit for a switching circuit, and the switching circuit.

BACKGROUND

In switching power supplies, in order to improve system efficiency, a freewheel diode is replaced with a synchronous rectifier. However, when the synchronous rectifier is turned off and the main switching transistor is turned on, it is necessary to insert dead time for preventing from shorting the main switching transistor directly. During the dead time, the synchronous rectifier is turned off before the main switching transistor is turned on, and the current passes through the body diode of the synchronous rectifier. When the main switching transistor is turned on, a reverse recovery current caused by turning on the body diode of the synchronous rectifier. The reverse recovery current causes a relatively large switching loss. Therefore, the problem to be solved urgently in switching power supplies is how to optimize the switching process of the turn-off of the synchronous rectifier and the turn-on of the main switching transistor.

SUMMARY

In view of the above, the present disclosure is aimed to provide a power device driving method and a driving circuit for a switching circuit, and the switching circuit, which are employed to solve the problem of the system efficiency reduction, caused by the turn-on of the body diode of the synchronous rectifier from the time when the synchronous rectifier is turned off, to the time when the main switching transistor is turned on.

The technical solution of the present disclosure is to provide a power device driving method for a switching circuit; the switching circuit includes a main switching transistor, a synchronous rectifier, and an inductive element. When a switching signal indicates that the synchronous rectifier is turned from on to off, and the main switching transistor is turned from off to on, a gate voltage of the synchronous rectifier is pulled down to be lower than a threshold voltage of the synchronous rectifier and higher than zero voltage by a body effect of a metal-oxide-semiconductor (MOS) transistor, and timing is started. When detecting that a gate voltage of the main switching transistor rises to a first voltage or the timing reaches a first time, the gate voltage of the synchronous rectifier is pulled down to the zero voltage.

Optionally, when the switching signal indicates that the synchronous rectifier is turned from on to off and the main switching transistor is turned from off to on, the gate voltage of the synchronous rectifier is pulled down to be close to, and lower than the threshold voltage of the synchronous rectifier.

Another technical solution of the present disclosure is to provide a power device driving circuit for a switching circuit. The switching circuit includes a main switching transistor, a synchronous rectifier, and an inductive element. When a switching signal indicates that the synchronous rectifier is turned from on to off and the main switching transistor is turned from off to on, a gate voltage of the synchronous rectifier is pulled down to be lower than a threshold voltage of the synchronous rectifier and higher than zero voltage by a body effect of a MOS transistor, then timing is started. When detecting that a gate voltage of the main switching transistor rises to a first voltage or the timing reaches a first time, the gate voltage of the synchronous rectifier is pulled down to the zero voltage.

Optionally, when the switching signal indicates that the synchronous rectifier is turned from on to off, and the main switching transistor is turned from off to on, the gate voltage of the synchronous rectifier is pulled down to be close to and lower than the threshold voltage of the synchronous rectifier.

Optionally, the power device driving circuit includes a synchronous rectifier driving circuit, and the synchronous rectifier driving circuit includes a first transistor, a second transistor, and a drive amplifying circuit. A gate, a source and a body of the first transistor are connected to each other, and are connected to a gate of the synchronous rectifier. The switching signal is connected to a gate of the second transistor through the drive amplifying circuit, and a drain of the first transistor is connected to the reference ground through the second transistor. When the switching signal indicates that the synchronous rectifier is turned from on to off and the main switching transistor is turned from off to on, the gate voltage of the synchronous rectifier is pulled down to be lower than the threshold voltage of the synchronous rectifier by the body effect of the first transistor.

Optionally, the first transistor and the synchronous rectifier are the same type of device.

Optionally, the synchronous rectifier driving circuit further includes a time delay circuit and a pull-down circuit. The time delay circuit receives the switching signal, the pull-down circuit receives an output voltage of the time delay circuit and pulls down the gate of the synchronous rectifier according to an output voltage of the pull-down circuit. When the switching signal indicates that the synchronous rectifier is turned from on to off and the main switching transistor is turned from off to on, the time delay circuit delays the first time, and the pull-down circuit pulls down the gate of the synchronous rectifier.

Optionally, the synchronous rectifier driving circuit further includes a comparison circuit and a pull-down circuit. The comparison circuit receives a driving signal of the main switching transistor, then the pull-down circuit receives an output voltage of the comparison circuit and pulls down the gate of the synchronous rectifier according to the output voltage of the comparison circuit. When the comparison circuit detects that a driving voltage of the main switching transistor is higher than a first driving voltage, the pull-down circuit pulls down the gate of the synchronous rectifier.

Another technical solution of the present disclosure is to provide a switching circuit.

Compared with the prior art, the circuit structure and the method of the present disclosure have the following advantages; the conduction of the body diode of the synchronous rectifier is reduced from the time when the synchronous rectifier is turned off to the time when the main switching transistor is turned on; then the switching loss is decreased and the conversion efficiency is improved.

DETAILED DESCRIPTION OF THE EMBODIMENTS

The preferred embodiments of the present disclosure are described in detail below in conjunction with the drawings, however the present disclosure is not limited to these embodiments. The present disclosure includes any alternatives, modifications, equivalents and alternatives obtained according to the spirit and scope of the present disclosure.

In order to provide the general public with a thorough understanding of the present disclosure, specific details of the present disclosure are described in the preferred embodiments of the present disclosure, and the present disclosure may be fully understood by those skilled in the art without this description of these details.

The present disclosure is more specifically described in the following paragraphs by way of example, with reference to the accompanying drawings. It should be noted that the drawings are all in a simplified form and all use non-precise proportions for conveniently and clearly assisting the description of the embodiments of the present disclosure.

Figure 1:
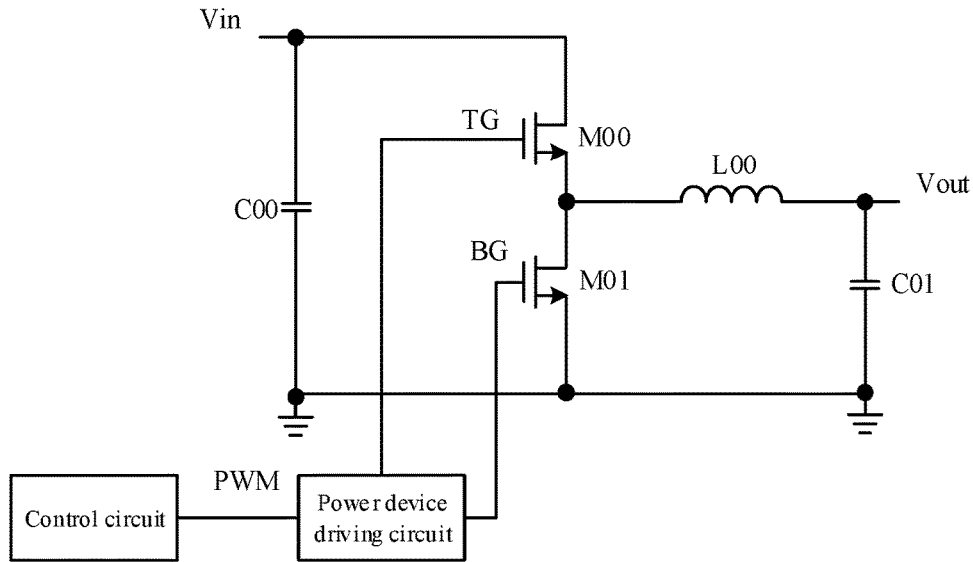
FIG. 1 is a circuit schematic diagram of a buck circuit with a synchronous rectifier.
Figure 2:
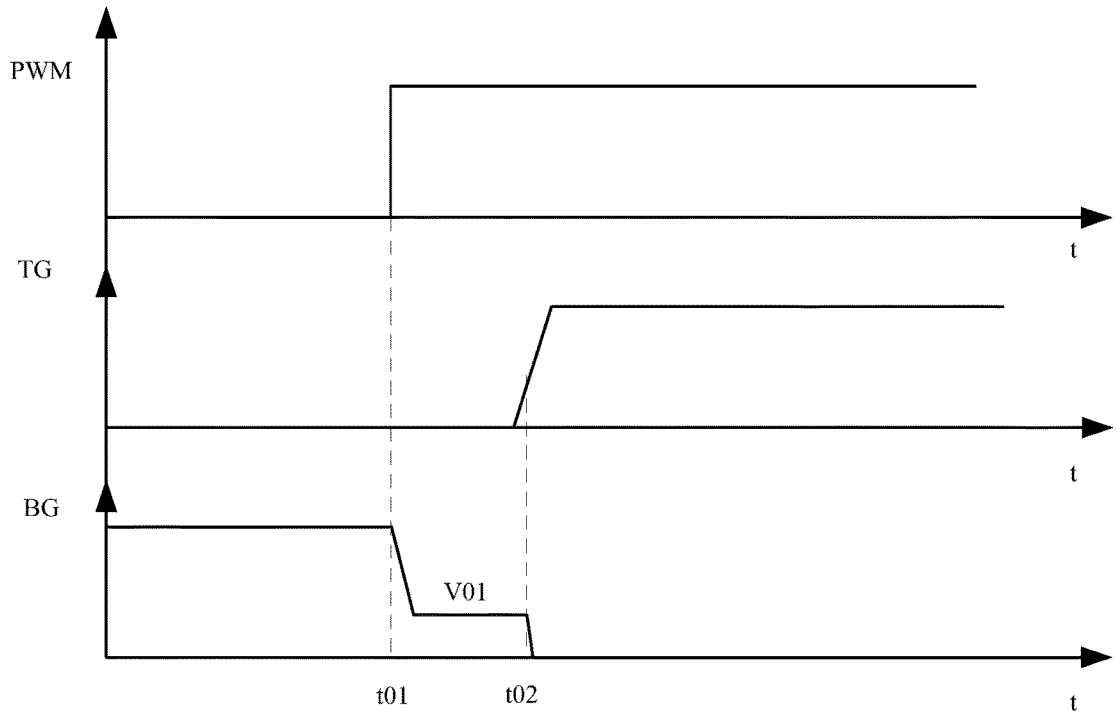
FIG. 2 is a schematic diagram of waveforms of a switching signal PWM, a gate voltage TG of a main switching transistor, and a gate voltage BG of a synchronous rectifier according to the present disclosure.

The present disclosure provides a power device driving circuit for a switching circuit. The switching circuit includes a main switching transistor, a synchronous rectifier, and an inductive element. When a switching signal indicates that the synchronous rectifier is turned from on to off and the main switching transistor is turned from off to on, a gate voltage of the synchronous rectifier is pulled down to be lower than a threshold voltage of the synchronous rectifier and higher than zero voltage by a body effect of a metal oxide semiconductor (MOS) transistor, and timing is started. When detecting that a gate voltage of the main switching transistor rises to a first voltage or the timing reaches a first time, the gate voltage of the synchronous rectifier is pulled down to the zero voltage. Both the main switching transistor and the synchronous rectifier are power devices, but the power device drive of the present disclosure mainly focuses on the drive of the synchronous rectifier. Taking the buck circuit as an example, referring to FIG. 1, the buck circuit is a buck circuit with a synchronous rectifier. The power device driving circuit receives the pulse width modulation (PWM) signal generated by a control circuit and generates a gate voltage TG of the main switching transistor and a gate voltage BG of the synchronous rectifier. FIG. 2 shows waveforms of a switching signal PWM, a gate voltage TG of a main switching transistor, and a gate voltage BG of a synchronous rectifier in the buck circuit. At time point t01, the gate voltage BG of the synchronous rectifier is pulled down to V01, that is, lower than the threshold voltage of the synchronous rectifier, and higher than zero voltage. When detecting that the gate voltage TG of the main switching transistor rises to the first voltage, the driving voltage of the synchronous rectifier is pulled down to zero voltage at time point t02. In another embodiment, at time point t01, the gate voltage of the synchronous rectifier is pulled down to V01, and timing is started. At time point t02, when the timing reaches the first time, the gate voltage of the synchronous rectifier is pulled down to zero voltage. The body effect of the MOS transistor is the effect of the body voltage on the channel, that is, the threshold voltage is increased by increasing the source to body reverse-bias voltage.

In one embodiment, when the switching signal indicates that the synchronous rectifier is turned from on to off and the main switching transistor is turned from off to on, the gate voltage of the synchronous rectifier is pulled down to be close to and lower than the threshold voltage of the synchronous rectifier.

Figure 3:
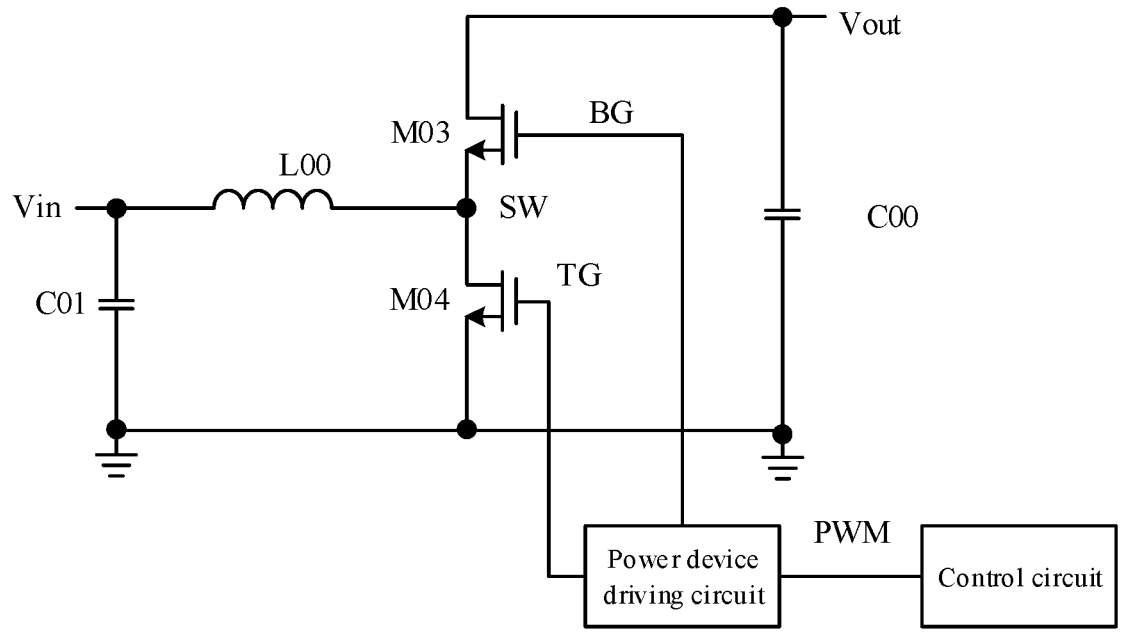
FIG. 3 is a circuit schematic diagram of a boost circuit with a synchronous rectifier, wherein the synchronous rectifier is an n-channel metal oxide semiconductor (NMOS)
Figure 4:
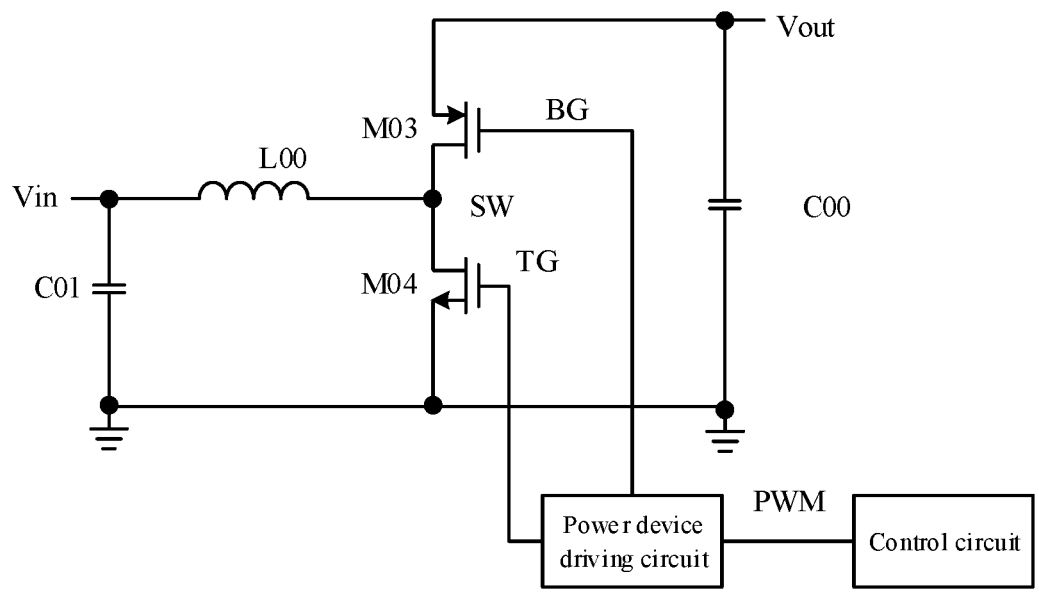
FIG. 4 is a circuit schematic diagram of a boost circuit with a synchronous rectifier, wherein the synchronous rectifier is a p-channel metal oxide semiconductor (PMOS)

The present disclosure is not limited to the buck circuit and may be used in any switching circuit with the synchronous rectifier. For example, it may also be used in a boost circuit. FIG. 3 shows a boost circuit with the synchronous rectifier M03, wherein the synchronous rectifier M03 is an NMOS. FIG. 4 shows a boost circuit with the synchronous rectifier M03, wherein the synchronous rectifier M03 is a PMOS.

Figure 5:
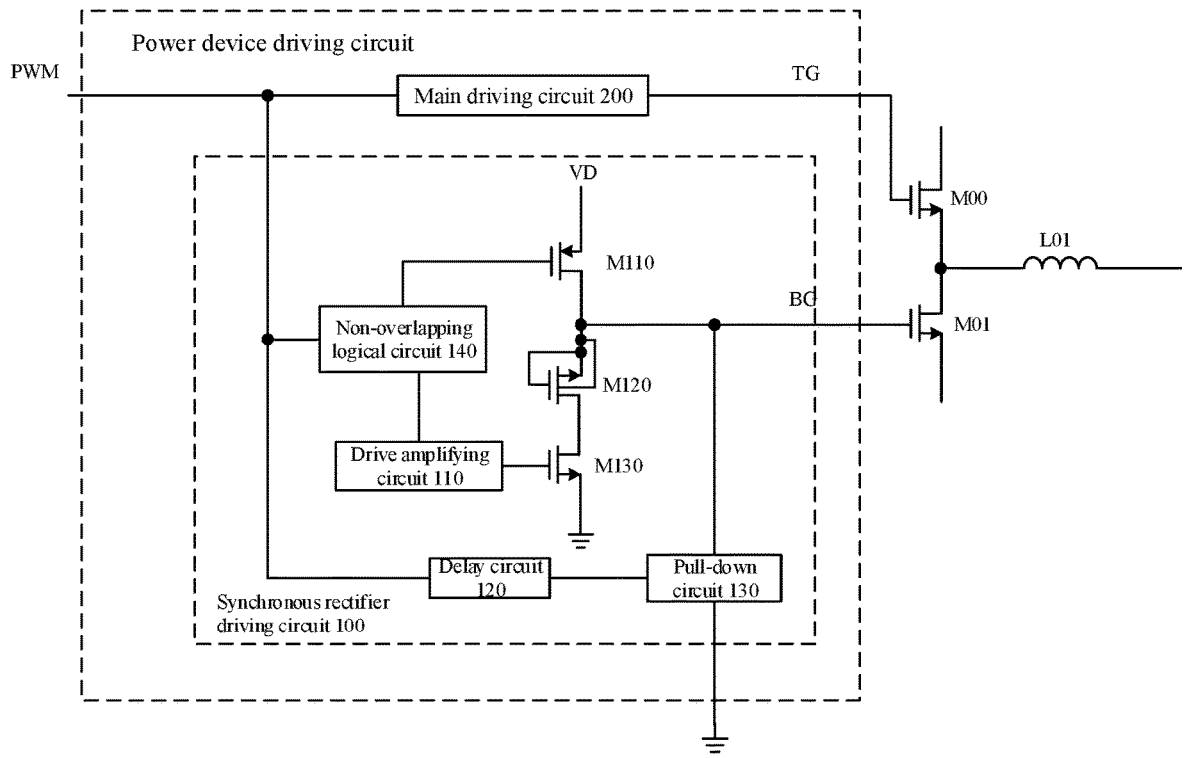
FIG. 5 is a schematic circuit diagram of a synchronous rectifier driving circuit according to an embodiment of the present disclosure.

Referring to FIG. 5, taking the buck circuit as an example, the power device driving circuit includes the synchronous rectifier driving circuit 100. The synchronous rectifier driving circuit 100 includes the first transistor M120, the second transistor M130, and the drive amplifying circuit 110. The first transistor is an NMOS. The gate, the source and the body of the first transistor are connected to each other and are connected to the gate BG of the synchronous rectifier. The switching signal is connected to the gate of the second transistor through a drive amplifying circuit, and the drain of the first transistor is connected to the reference ground through the second transistor. When the switching signal indicates that the synchronous rectifier is turned from on to off and the main switching transistor is turned from off to on, the gate voltage of the synchronous rectifier is pulled down to be lower than the threshold voltage of the synchronous rectifier by the body effect of the first transistor M120. Since the voltage on the M120 is the voltage between the gate and the drain, the body voltage is higher than the drain voltage, and the threshold voltage of the transistor is decreased. In many cases, as the drain and the source are equivalent in the transistors, which is similar to the body effect, that is, if the body voltage is lower than the source voltage, then the threshold value of the transistor is increased; and if the body voltage is higher than the source voltage, then the threshold value of the transistor is decreased.

In one embodiment, referring to FIG. 5 the synchronous rectifier driving circuit further includes the non-overlapping logical circuit 140 and a pull-up circuit. In FIG. 5, the pull-up circuit is implemented by the PMOS M110. The switching signal PWM generates driving signals of the M110 and M130 by the non-overlapping logical circuit 140, respectively, which are not overlapped to each other, so that the M110 and the M130 are not turned on at the same time for prevention from shorting directly. The pull-up circuit M110 turns on the synchronous rectifier by pulling up the BG, and when the synchronous rectifier is turned off, the M110 is turned off.

In one embodiment, the first transistor M120 and the synchronous rectifier M01 are the same type of device. The turn-on threshold value of the first transistor M120 are configured to be close to the turn-on threshold value of the synchronous rectifier M01, so that the turn-on threshold value of the first transistor is adjusted by changing the body voltage of the first transistor M120.

In an embodiment, referring to FIG. 5, the synchronous rectifier driving circuit 100 further includes the delay circuit 120 and the pull-down circuit 130. The delay circuit 120 receives the switching signal PWM. The pull-down circuit 130 receives the output voltage of the delay circuit 120 and pulls down the gate BG of the synchronous rectifier according to the output voltage of the pull-down circuit 130. When the switching signal indicates that the synchronous rectifier is turned from on to off and the main switching transistor is turned from off to on, the delay circuit 120 delays the first time, and the pull-down circuit 130 pulls down the gate BG of the synchronous rectifier.

Figure 6:
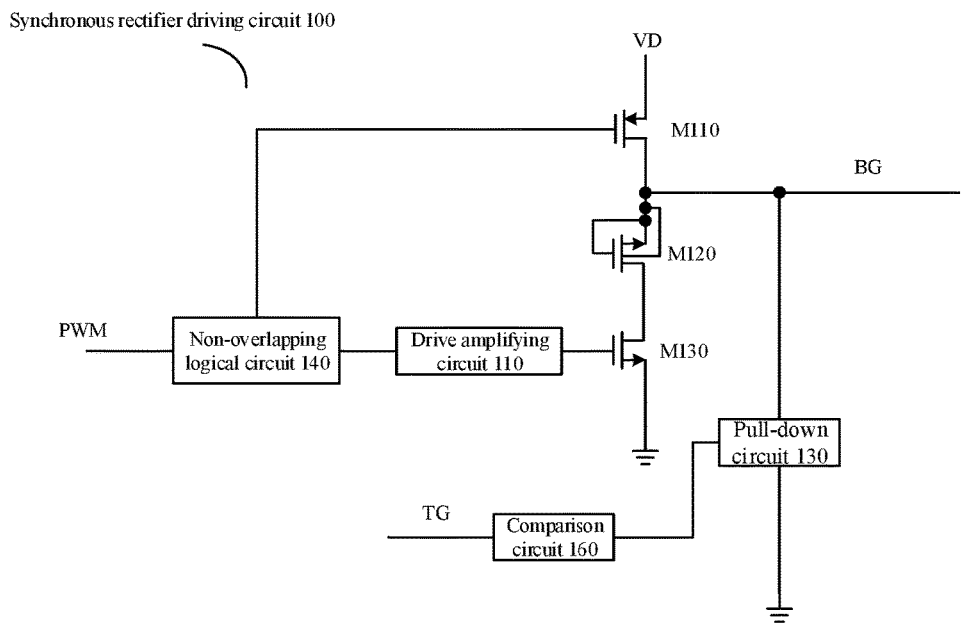
FIG. 6 is a schematic circuit diagram of a synchronous rectifier driving circuit according to another embodiment of the present disclosure.

In another embodiment, referring to FIG. 6, the synchronous rectifier driving circuit further includes the comparison circuit 160 and the pull-down circuit 130. The comparison circuit 160 receives the driving signal TG of the main switching transistor. The pull-down circuit 130 receives the output voltage of the comparison circuit 160 and it pulls down the gate BG of the synchronous rectifier according to the output voltage of the comparison circuit 160. When the comparison circuit detects that the driving voltage of the main switching transistor is higher than the first driving voltage, the pull-down circuit 130 pulls down the gate BG of the synchronous rectifier.

Figure 7:
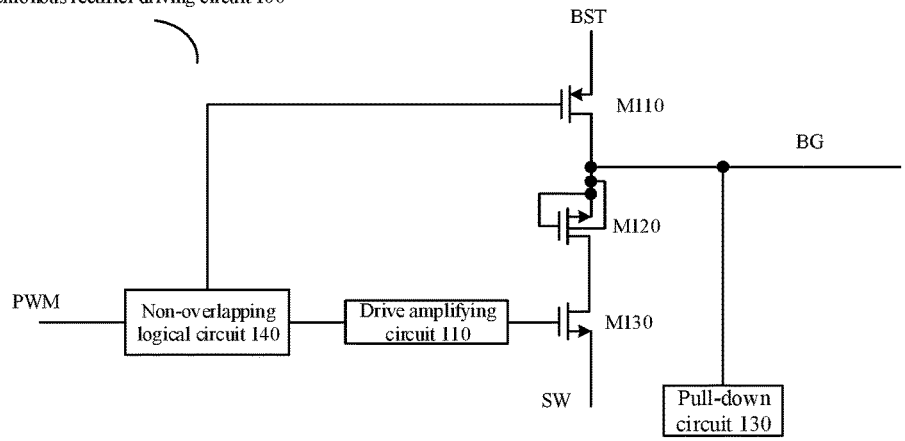
FIG. 7 is a schematic circuit diagram of a synchronous rectifier driving circuit in which a synchronous rectifier is an NMOS in a boost circuit according to an embodiment of the present disclosure.

FIG. 7 shows an embodiment of the synchronous rectifier driving circuit 200 of the boost circuit in FIG. 3. The difference from FIG. 5 and FIG. 6 is that the supply voltage of the synchronous rectifier driving circuit is between the BST voltage and the SW voltage, not between the VD and the reference ground. BST voltage and SW voltage maintain relatively stable voltages through a capacitor, and charge the capacitor through the VD when the lower transistor is turned on, so that a relatively stable supply voltage is obtained between the BST voltage and the SW voltage.

Figure 8:
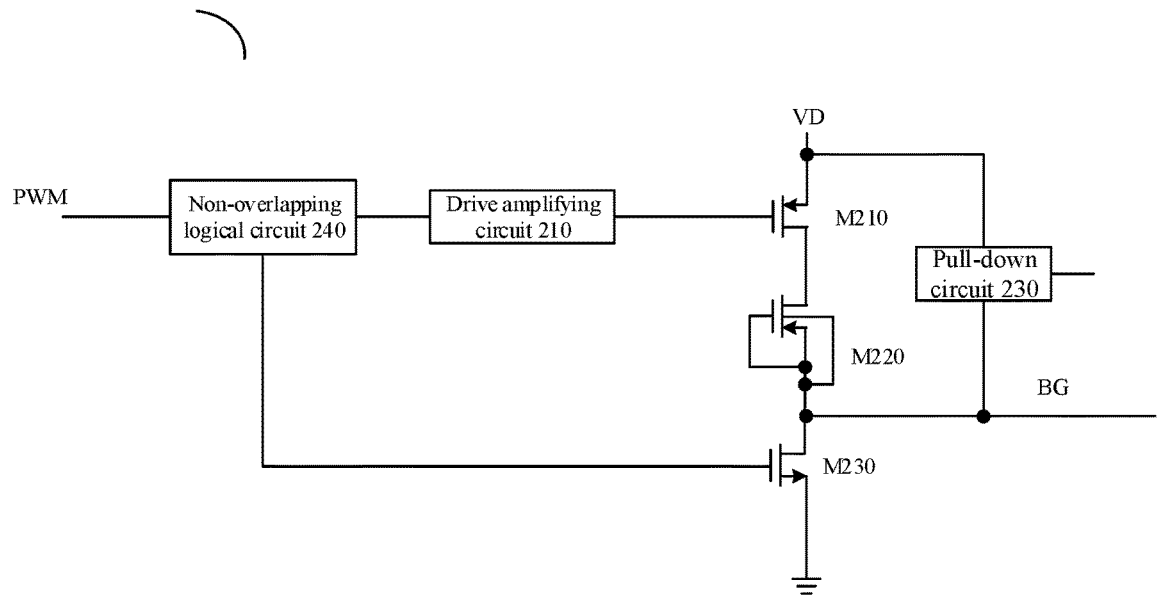
FIG. 8 is a schematic circuit diagram of a synchronous rectifier driving circuit in which a synchronous rectifier is a PMOS in a boost circuit according to an embodiment of the present disclosure.

FIG. 8 shows an embodiment of the synchronous rectifier driving circuit 200 of the boost circuit in FIG. 4. The power device driving circuit includes the synchronous rectifier driving circuit 200. The synchronous rectifier driving circuit 200 includes the transistor M220, the transistor M210, and the drive amplifying circuit 210. The switch transistor M220 is a PMOS. A gate, a source and a body of the M220 are connected to each other and are connected to the gate BG of the synchronous rectifier. The switching signal is connected to the gate of the M210 through the drive amplifying circuit 210, and the drain of the M220 is connected to the power port VD through the M210. When the switching signal indicates that the synchronous rectifier is turned from on to off and the main switching transistor is turned from off to on, the gate voltage of the synchronous rectifier is pulled up to be higher than the threshold voltage of the synchronous rectifier by the body effect of the transistor M220. Since the M220 is a PMOS, the synchronous rectifier is prevented from turning on by pulling the threshold voltage up above the threshold voltage of the synchronous rectifier.

In one embodiment, referring to FIG. 8, the synchronous rectifier driving circuit further includes the non-overlapping logical circuit 240 and the pull-down circuit. In FIG. 8, the pull-down circuit is implemented by the NMOS M230. The switching signal PWM generates driving signals of the M210 and the M230 by the non-overlapping logical circuit 240, respectively, which are not overlapped to each other so that the M210 and the M230 are not turned on at the same time preventing the M210 and the M230 from shorting directly. The pull-down circuit M230 turns on the synchronous rectifier by pulling down the BG, and when the synchronous rectifier is turned off, the M230 is turned off.

The present disclosure provides a power device driving method for a switching circuit. The switching circuit includes a main switching transistor, a synchronous rectifier, and an inductive element. When a switching signal indicates that the synchronous rectifier is turned from on to off and the main switching transistor is turned from off to on, a gate voltage of the synchronous rectifier is pulled down to be lower than a threshold voltage of the synchronous rectifier and higher than zero voltage by a body effect of a MOS transistor, and timing is started. When detecting that a gate voltage of the main switching transistor rises to a first voltage or the timing reaches a first time, the gate voltage of the synchronous rectifier is pulled down to zero voltage.

In one embodiment, when the switching signal indicates that the synchronous rectifier is turned from on to off and the main switching transistor is turned from off to on, the gate voltage of the synchronous rectifier is pulled down to be close to and lower than the threshold voltage of the synchronous rectifier.

The embodiments are described and illustrated separately above, yet, referring to some common technologies. Substitutions and integrations can be made from the embodiments by those skilled in the art. For a detail that is not explicitly described in one embodiment, another embodiment that describes the detail can be used as the reference.

The aforementioned embodiments, does not constitute a limitation the scope of the technical solutions. Any modifications, equivalent substitutions and improvements made within the spirit and principles of the aforementioned embodiments should fall within the scope of the technical solution for protection.

What is claimed is:

1. A power device driving circuit for a switching circuit, wherein the switching circuit comprises: a main switching transistor, a synchronous rectifier, and an inductive element;
   when a switching signal indicates that the synchronous rectifier is turned from on to off and the main switching transistor is turned from off to on, a gate voltage of the synchronous rectifier is pulled down to be lower than a threshold voltage of the synchronous rectifier and higher than zero voltage by a body effect of a MOS transistor, and timing is started; and
   when detecting that a gate voltage of the main switching transistor rises to a first voltage or the timing reaches a first time, the gate voltage of the synchronous rectifier is pulled down to the zero voltage;
   wherein, the power device driving circuit comprises a synchronous rectifier driving circuit, and the synchronous rectifier driving circuit comprises a first transistor, a second transistor, and a drive amplifying circuit; a gate, a source and a body of the first transistor are connected to each other, and are connected to a gate of the synchronous rectifier; the switching signal is connected to a gate of the second transistor through the drive amplifying circuit, and a drain of the first transistor is connected to a reference ground through the second transistor; when the switching signal indicates that the synchronous rectifier is turned from on to off and the main transistor is turned from off to on, the gate voltage of the synchronous rectifier is pulled down to be lower than the threshold voltage of the synchronous rectifier by the body effect of the first transistor.

2. The power device driving circuit of claim 1, wherein, the first transistor and the synchronous rectifier are a same type of device.

3. The power device driving circuit of claim 1, wherein, the synchronous rectifier driving circuit further comprises a delay circuit and a pull-down circuit; the delay circuit receives the switching signal, the pull-down circuit receives an output voltage of the delay circuit and pulls down the gate of the synchronous rectifier according to an output voltage of the pull-down circuit; when the switching signal indicates that the synchronous rectifier is turned from on to off and the main switching transistor is turned from off to on, the delay circuit delays the first time, and the pull-down circuit pulls down the gate of the synchronous rectifier.

4. The power device driving circuit of claim 1, wherein, the synchronous rectifier driving circuit further comprises a comparison circuit and a pull-down circuit, the comparison circuit receives a driving signal of the main switching transistor, the pull-down circuit receives an output voltage of the comparison circuit and pulls down the gate of the synchronous rectifier according to the output voltage of the comparison circuit; when the comparison circuit detects that a driving voltage of the main switching transistor is higher than a first driving voltage, the pull-down circuit pulls down the gate of the synchronous rectifier.

5. A switching circuit, comprising the power device driving circuit of claim 1.

6. The switching circuit of claim 5, wherein, when the switching signal indicates that the synchronous rectifier is turned from on to off, and the main switching transistor is turned from off to on, the gate voltage of the synchronous rectifier is pulled down to be close to and lower than the threshold voltage of the synchronous rectifier.

7. The switching circuit of claim 5, wherein, the first transistor and the synchronous rectifier are a same type of device.

8. The switching circuit of claim 5, wherein, the synchronous rectifier driving circuit further comprises a time delay circuit and a pull-down circuit; the time delay circuit receives the switching signal, the pull-down circuit receives an output voltage of the time delay circuit and pulls down the gate of the synchronous rectifier according to an output voltage of the pull-down circuit; when the switching signal indicates that the synchronous rectifier is turned from on to off and the main switching transistor is turned from off to on, the time delay circuit delays the first time, and the pull-down circuit pulls down the gate of the synchronous rectifier.

9. The switching circuit of claim 5, wherein, wherein, the synchronous rectifier driving circuit further comprises a comparison circuit and a pull-down circuit, the comparison circuit receives a driving signal of the main switching transistor, the pull-down circuit receives an output voltage of the comparison circuit and pulls down the gate of the synchronous rectifier according to the output voltage of the comparison circuit; when the comparison circuit detects that a driving voltage of the main switching transistor is higher than a first driving voltage, the pull-down circuit pulls down the gate of the synchronous rectifier.

10. A power device driving method for a switching circuit, using the power device driving circuit of claim 1, wherein, the switching circuit comprises a main switching transistor, a synchronous rectifier, and an inductive element; and the power device driving method comprises:
when a switching signal indicates that the synchronous rectifier is turned from on to off, and the main switching transistor is turned from off to on, pulling down a gate voltage of the synchronous rectifier to be lower than a threshold voltage of the synchronous rectifier and higher than zero voltage by a body effect of a metal-oxide-semiconductor (MOS) transistor, and starting timing; and
when detecting that a gate voltage of the main switching transistor rises to a first voltage or the timing reaches a first time, pulling down the gate voltage of the synchronous rectifier to the zero voltage.

\* \* \* \* \*